United States Patent
Chang et al.

(10) Patent No.: US 10,387,111 B1
(45) Date of Patent: Aug. 20, 2019

(54) ELECTRONIC DEVICE AND METHOD FOR ADJUSTING SOUND

(71) Applicant: NANNING FUGUI PRECISION INDUSTRIAL CO., LTD., Nanning (CN)

(72) Inventors: Wen-Hsin Chang, New Taipei (TW); Chang-Te Wu, New Taipei (TW)

(73) Assignee: NANNING FUGUI PRECISION INDUSTRIAL CO., LTD., Nanning (CN)

( * ) Notice: Subject to any disclaimer, the term of this patent is extended or adjusted under 35 U.S.C. 154(b) by 0 days.

(21) Appl. No.: 16/211,741

(22) Filed: Dec. 6, 2018

(51) Int. Cl.
*G06F 3/16* (2006.01)
*G01S 15/08* (2006.01)
*H04R 29/00* (2006.01)

(52) U.S. Cl.
CPC .............. *G06F 3/165* (2013.01); *G01S 15/08* (2013.01); *H04R 29/001* (2013.01)

(58) Field of Classification Search
CPC ........ G06F 3/165; G01S 15/08; H04R 29/001
See application file for complete search history.

(56) References Cited

U.S. PATENT DOCUMENTS

2010/0210922 A1* 8/2010 Clasbrummel ...... A61B 5/0028
600/301

\* cited by examiner

*Primary Examiner* — Regina N Holder
(74) *Attorney, Agent, or Firm* — ScienBiziP, P.C.

(57) ABSTRACT

A method for adjusting the output of sound to allow for orientation and reorientation of a sound source device in relation to a listener comprises the control of sound generators in the device to output successive sounds to ambient environment and collect the sound echoes from listening surfaces of user to form a lookup history. Horizontal distance λ and an included angle α between the electronic device and the ear cavities or other surfaces of user, and a vertical displacement d of the electronic device are calculated. Horizontal distance difference λ' and a Doppler factor D are further calculated. A gas generator is controlled to input gas into deformable areas of platform which holds the sound generators to allow for instant particular orientations. A shape deformation factor S of the deformable areas is determined. Original factory settings of the device can be adjusted according to instant calculations and lookup history.

11 Claims, 8 Drawing Sheets

ELECTRONIC DEVICE AND METHOD FOR ADJUSTING SOUND

FIELD

The subject matter herein generally relates to sound playback.

BACKGROUND

Music can be played from sound players such as smart phones and tablet computers. However, acoustic of music from the sound players largely depend on the orientation of the sound player and the location of the audience.

Therefore, there is room for improvement in the art.

BRIEF DESCRIPTION OF THE DRAWINGS

Implementations of the present disclosure will now be described, by way of embodiments only, with reference to the attached figures.

DETAILED DESCRIPTION

Figure 1:
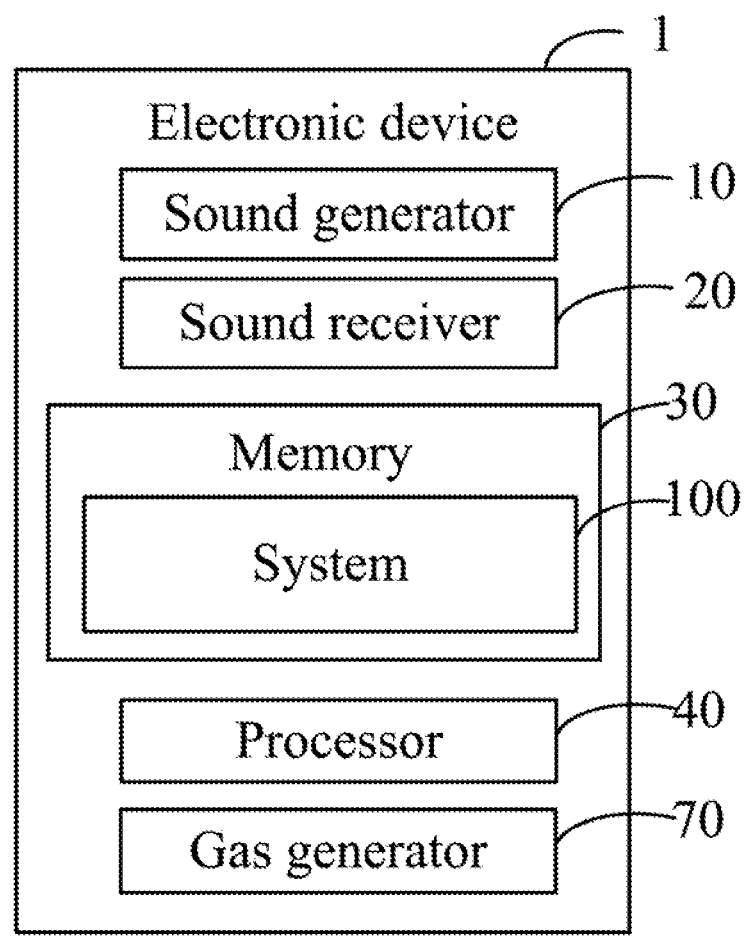
FIG. 1 is a block diagram of an embodiment of an electronic device according to the present disclosure.

It will be appreciated that for simplicity and clarity of illustration, where appropriate, reference numerals have been repeated among the different figures to indicate corresponding or analogous components. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The term "comprising," when utilized, means "including, but not necessarily limited to"; it specifically indicates open-ended inclusion or membership in the so-described combination, group, series, and the like.

FIG. 1 illustrates an embodiment of an electronic device 1. The electronic device 1 can be a smart phone or a table computer.

Figure 2:
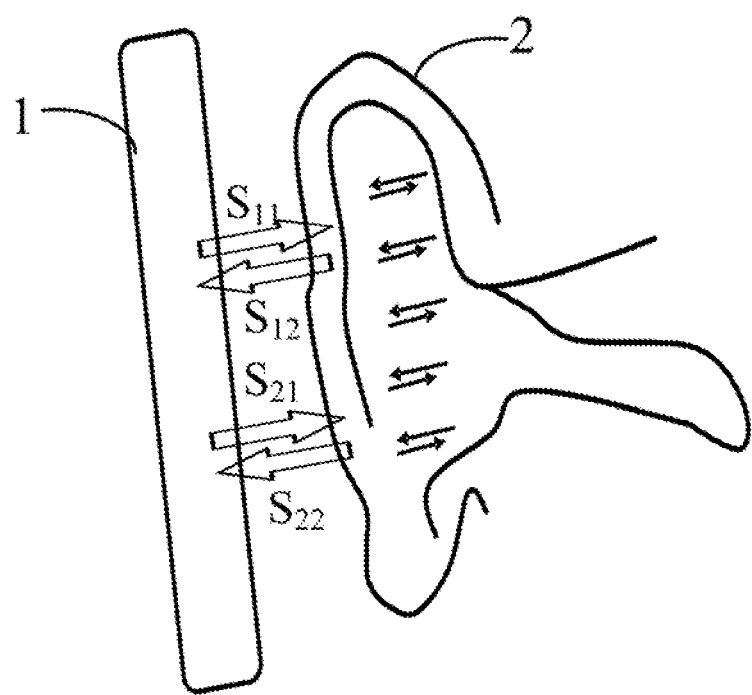
FIG. 2 is a diagrammatic view of sound paths when the electronic device of FIG. 1 being placed adjacent to an auricle of an audience.

The electronic device 1 includes at least one sound generator 10 and a sound receiver 20. The sound generator 10 sends sound signals (for example, the first sound signals $S_{11}$ and successive second sound signals $S_{21}$ described hereinafter) to an ambient environment of the electronic device 1. Referring to FIG. 2, when a volumetric region of interest 2 (for example, an auricle or an eye socket that includes a cavity structure) of an audience is positioned adjacent to the electronic device 1 (for example, when the audience holds the electronic device 1 to listen and talk during a phone call), the sound signals are propagated towards the volumetric region of interest 2. A portion of the sound signals hit and are reflected by the volumetric region of interest 2, to form echo signals (for example, the first echo signals $S_{12}$ and the successive second echo signals $S_{22}$ described hereinafter). The sound receiver 20 collects the echo signals from the volumetric region of interest 2.

In an embodiment, the sound generator 10 and the sound receiver 20 are transmitter and receiver of an ultrasound probing unit, respectively. The sound signals are generated by vibrations generated by the transmitter of the ultrasound probing unit. In another embodiment, the sound generator 10 is a speaker that can generate sound. The sound receiver 20 can be a microphone.

Figure 3:
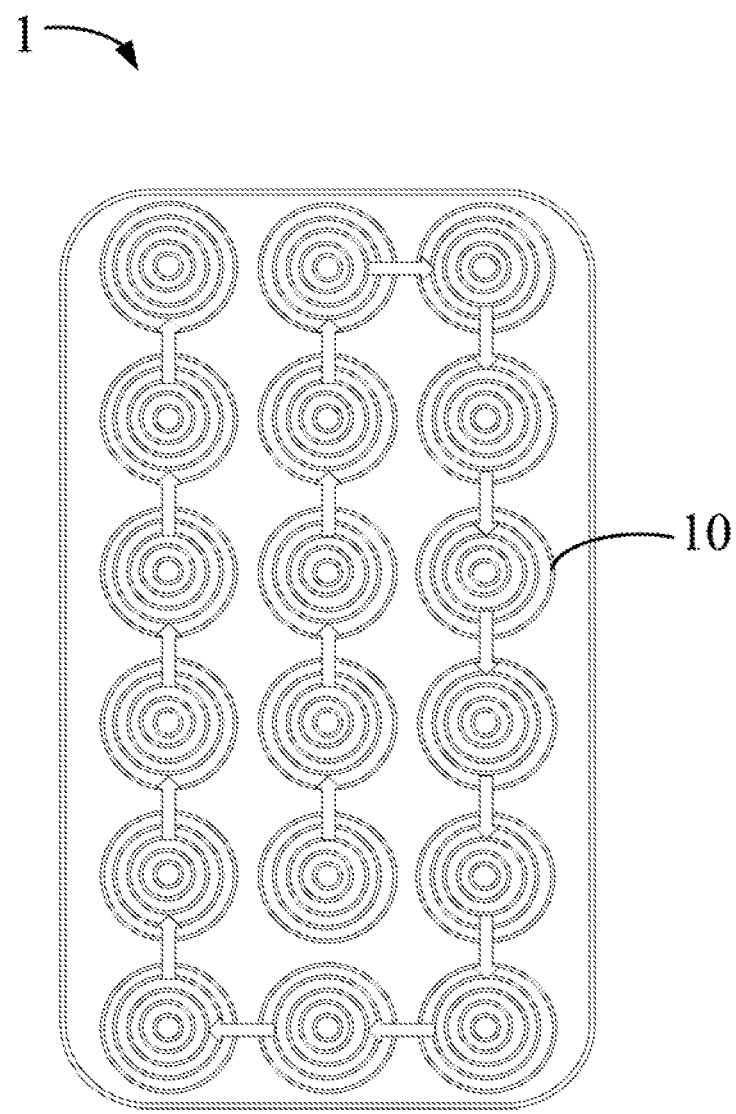
FIG. 3 is a diagrammatic view of sound generators of the electronic device of FIG. 1.

In one embodiment, the sound generator 10 is the vibration generator, referring to FIG. 3, the sound generators 10 are arranged in a matrix. In this embodiment, 18 of the sound generators 10 are arranged in a 6×3 matrix. The sound generators 10 orderly output the sound signals in the order shown by the arrows in FIG. 3.

Referring to FIG. 1, the electronic device 1 further includes a memory 30 and a processor 40. The memory 30 stores a system 100 for adjusting sound. The system 100 comprises a number of modules, which are a collection of software instructions executable by the processor 40 to perform the function of the system 100. In an embodiment, the memory 30 can be an internal storage device built inside the electronic device 1. In other embodiments, the memory 30 can be an external storage device removably connected to the electronic device 1. In one embodiment, the memory 30 can be a smart media card, a secure digital card, or a flash card. The processor 40 can be a central processing unit, a microprocessor, or any other suitable chip having data processing function.

Figure 4:
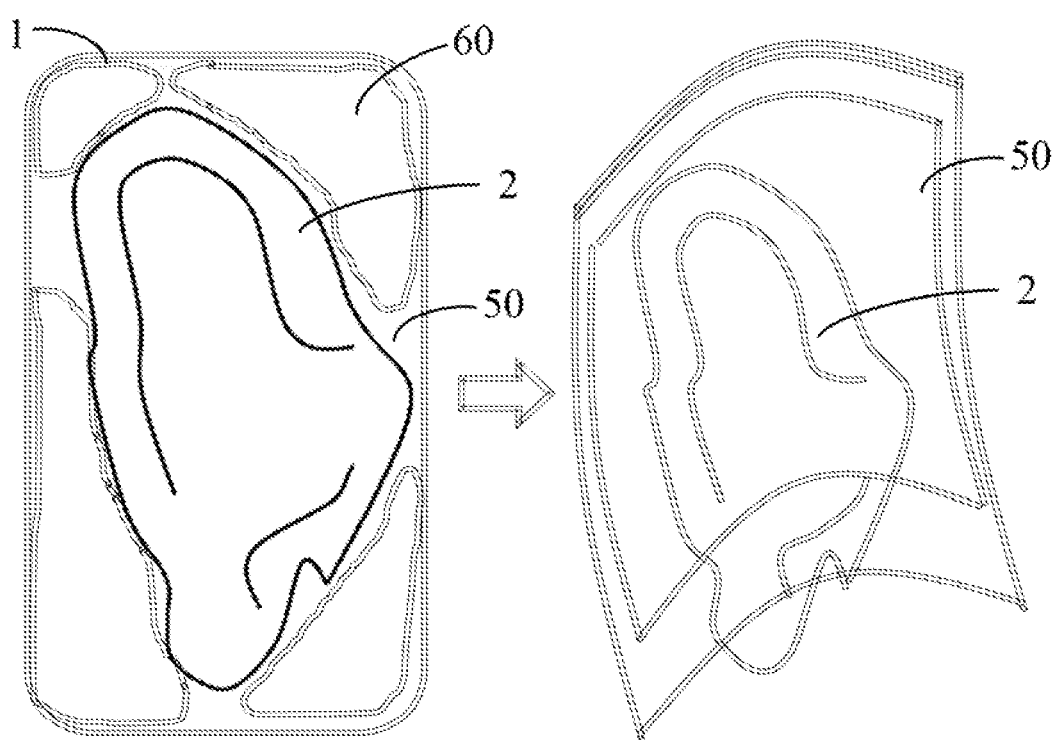
FIG. 4 is a diagrammatic view of deformation areas of the electronic device of FIG. 1.

Referring to FIGS. 1 and 4, the electronic device 1 further includes a flexible panel 50, a number of deformation areas 60, and a gas generator 70. The deformation areas 60 are positioned under the flexible panel 50 and along edges of the flexible panel 50. Each deformation area 60 can be a gas bag. The gas generator 70 is connected to each deformation area 60. When the gas generator 70 inputs gas in the deformation area 60, the deformation area 60 deforms, and thus the flexible panel 50 deforms. Thus, when the audience places the auricle adjacent to the flexible panel 50, the deformed deformation area 60 can be adapted to and even wrap around the auricle.

Figure 7:
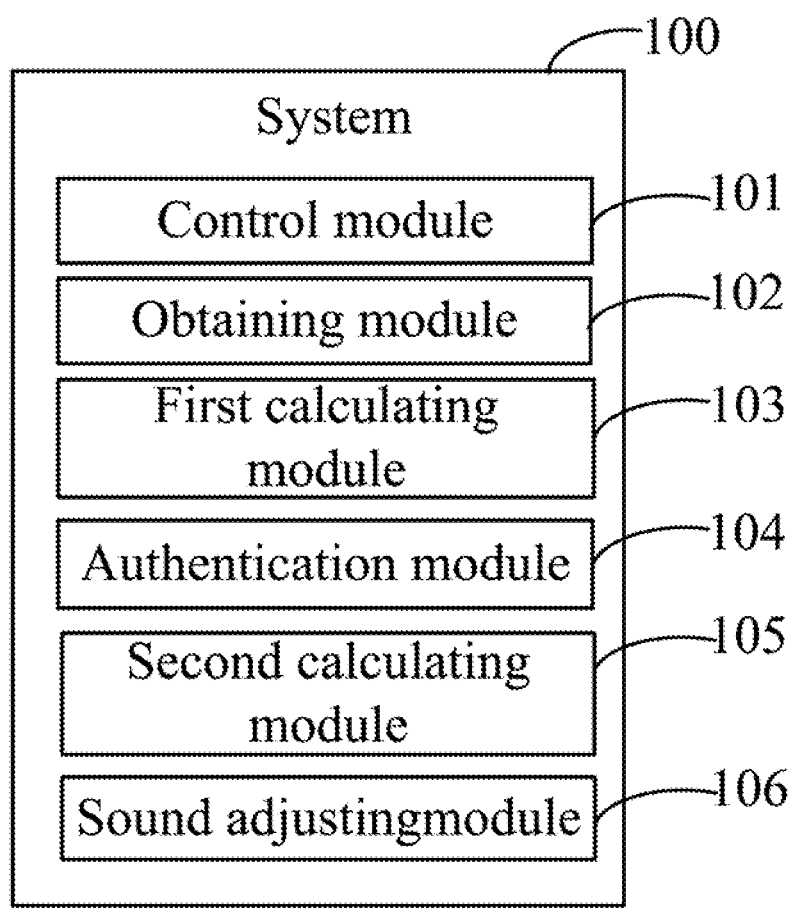
FIG. 7 is a block diagram of an embodiment of a system for adjusting sound.

Referring to FIG. 7, the system 100 includes a control module 101, an obtaining module 102, a first calculating module 103, an authentication module 104, a second calculating module 105, and a sound adjusting module 106.

Figure 8:
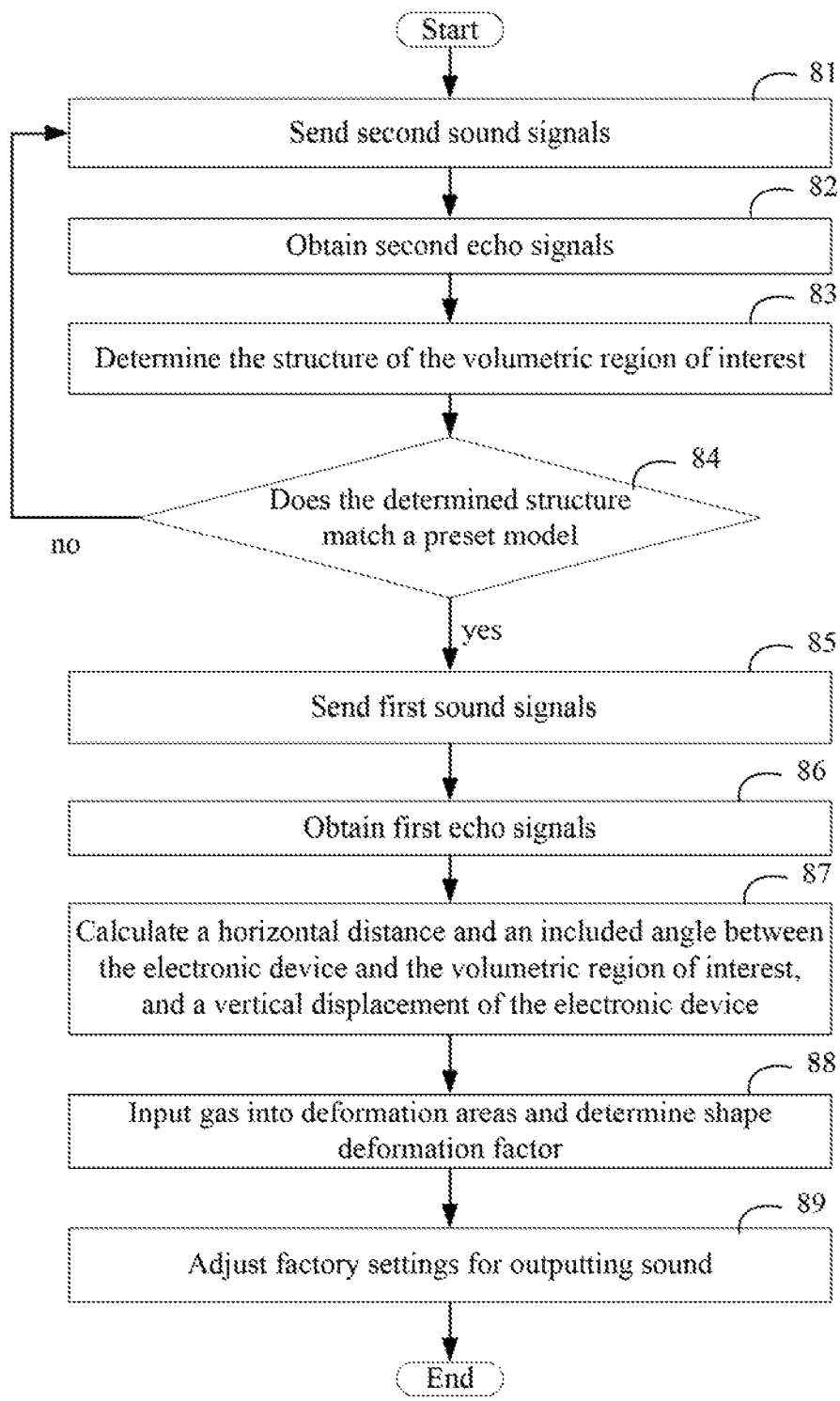
FIG. 8 is a flowchart of an embodiment of a sound adjusting method.

FIG. 8 illustrates an embodiment of a method for adjusting sound. The method is provided by way of embodiments, as there are a variety of ways to carry out the method. Each block shown in FIG. 8 represents one or more processes, methods, or subroutines, carried out in the example method. Furthermore, the illustrated order of blocks is illustrative only and the order of the blocks can change. Additional blocks can be added or fewer blocks may be utilized or the order of the blocks may be changed, without departing from this disclosure. The method can begin at block 81.

At block 81, the control module 101 controls the sound generators 10 to send successive sound signals (hereinafter, the second sound signals $S_{21}$). The second sound signals $S_{21}$ are propagated towards the volumetric region of interest 2. A portion of the second sound signals $S_{21}$ hit and are reflected by the volumetric region of interest 2, to form the echo signals (hereinafter, the second echo signals $S_{22}$).

In an embodiment, the second sound signals $S_{21}$ can have same or different sound characteristics. For example, when the second sound signals $S_{21}$ are generated by vibrations, the second sound signals $S_{21}$ can have different amplitudes of vibrations. When the second sound signals $S_{21}$ are music signals, the second sound signals $S_{21}$ can have different frequencies and amplitudes.

At block 82, the obtaining module 102 obtains the second echo signals $S_{22}$ from the sound receiver 20.

Referring to FIG. 2, in an embodiment, the volumetric region of interest 2 is the auricle of the audience. Since each auricle may have individual shape and structure, the second echo signals $S_{22}$ reflected by the auricle may be individualized, which allows the second echo signals $S_{22}$ to be used to identify different auricles for biometric authentications.

At block 83, the first calculating module 103 calculates structural characteristics of the volumetric region of interest 2 according to the second echo signals $S_{22}$, and determines the structure of the volumetric region of interest 2 according to the calculated structural characteristics.

Figure 5:
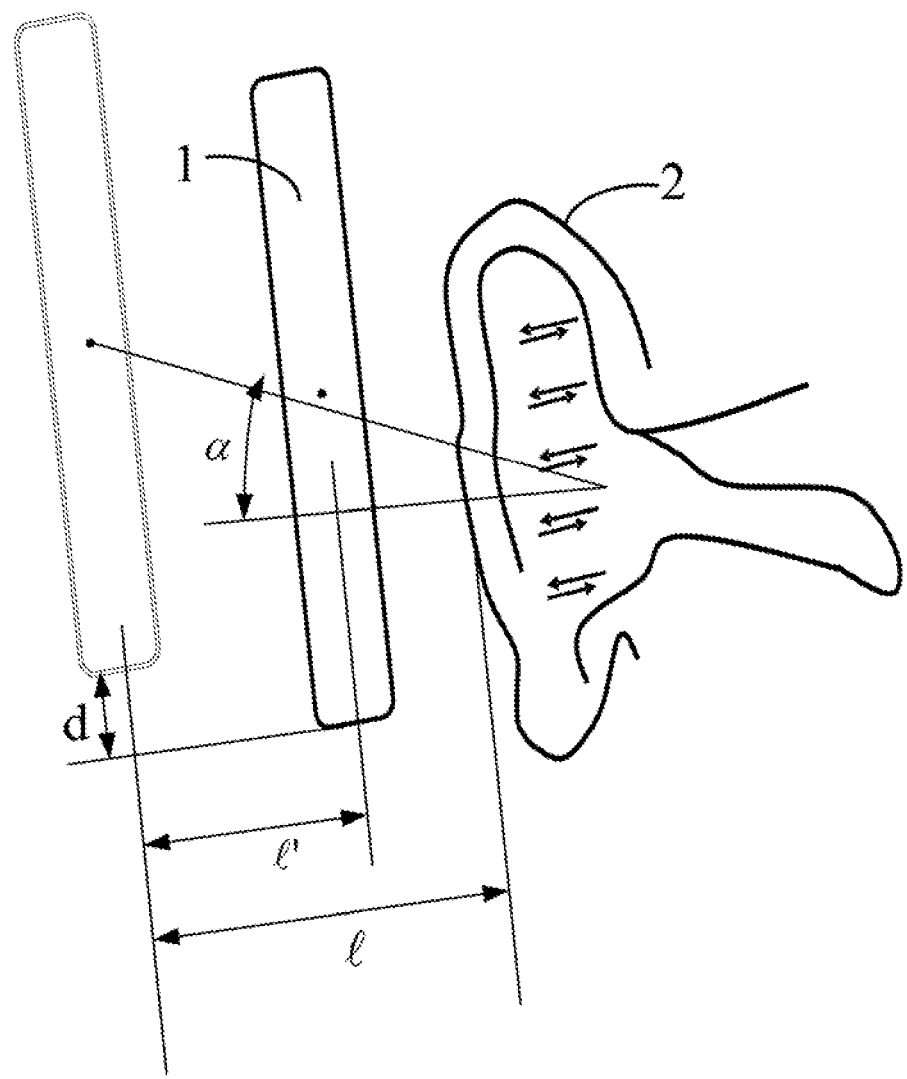
FIG. 5 is a diagrammatic view showing movement between the electronic device and the auricle of FIG. 2.

Referring to FIG. 5, the second echo signals $S_{22}$ hitting and being reflected by a point (detecting point) of the volumetric region of interest 2, the greater of the horizontal distance λ between the electronic device 1 and the detecting point, the greater is of the intensity attenuation of the second echo signals $S_{22}$ with respect to the second sound signals $S_{21}$. Thus, in an embodiment, the first calculating module 103 can calculate the horizontal distance λ according to the intensity attenuation of the second echo signals $S_{22}$ with respect to the second sound signals $S_{21}$. In another embodiment, the first calculating module 103 can calculate the horizontal distance λ according to the time delay of the second echo signals $S_{22}$ with respect to the second sound signals $S_{21}$. By calculating the horizontal distances λ between the electronic device 1 and a number of detecting points, the distribution of the detecting points are obtained. Then, the first calculating module 103 can determine the structure of the volumetric region of interest 2.

Figure 6:
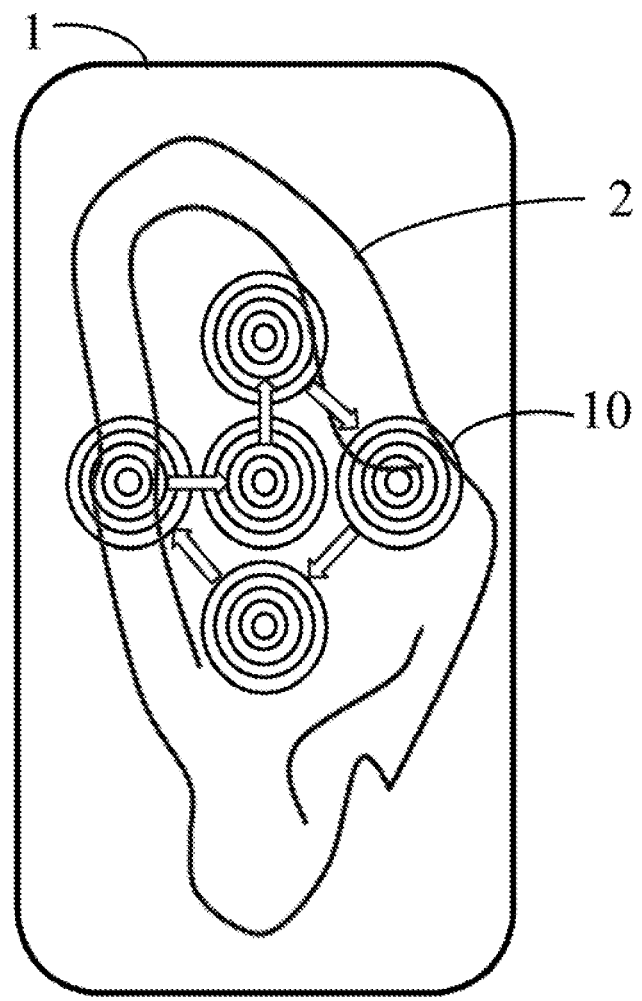
FIG. 6 is diagrammatic view illustrating an operation principle of the sound generators of FIG. 3.

Furthermore, referring to FIG. 6, the control module 101 controls the sound generators 10 spirally arranged to orderly send the second sound signals $S_{21}$. The detecting points that reflect the second sound signals $S_{21}$ are also spirally arranged. In another embodiment, the control module 101 can also control randomly-arranged sound generators 10 to orderly send the second sound signals $S_{21}$.

At block 84, the authentication module 104 determines whether the structure determined by the first calculating module 103 matches a preset model. If yes, the procedure proceeds to block 85, otherwise block 81 is repeated.

In an embodiment, the authentication module 104 determines a similarity between the determined structure and the preset model, and compares the determined similarity with a similarity threshold. When the determined similarity is greater than the similarity threshold, the authentication module 104 can determine that the determined structure matches the preset model and give authentication.

At block 85, the control module 101 controls the sound generators 10 to send successive sound signals again (hereinafter, the first sound signals Su). The first sound signals $S_{11}$ are propagated towards the volumetric region of interest 2. A portion of the first sound signals $S_{11}$ hit and are reflected by the volumetric region of interest 2, to form the echo signals (hereinafter, the first echo signals $S_{12}$).

In an embodiment, when the determined similarity is greater than the similarity threshold, the authentication module 104 first determines whether the electronic device 1 is locked or unlocked. When the electronic device 1 is locked, the control module 101 unlocks the electronic device 1, and controls the sound generators 10 to send the first sound signals Su. When the electronic device 1 is unlocked, the control module 101 directly controls the sound generators 10 to send the first sound signals $S_{11}$. The authentication module 104 can determine whether the electronic device 1 is locked according to the applications currently running or by the wallpapers currently displayed. The authentication module 104 can also determine whether the electronic device 1 displays a locking pattern, to determine whether the electronic device 1 is locked.

In another embodiment, the electronic device 1 can further include a timer (not shown). When the determined structure does not match the preset model and the electronic device 1 is unlocked, the control module 101 controls the timer to count down through a variable R. The variable R represents a number of challenge rounds and may be preset to an integer number, such as three. When the variable R has been counted down to zero, the control module 101 locks the electronic device 1 to deny the audience access to the electronic device 1.

At block 86, the obtaining module 102 obtains the first echo signals $S_{12}$ from the sound receiver 20.

At block 87, referring to FIG. 5, the second calculating module 105 calculates the horizontal distance λ between the electronic device 1 and the volumetric region of interest 2 according to the first echo signals $S_{12}$. An included angle α between the electronic device 1 and the volumetric region of interest 2, and a vertical displacement d of the electronic device 1, is also calculated according to the first echo signals $S_{12}$. The second calculating module 105 further calculates a difference λ' in horizontal distance (that is, a difference λ' between the calculated horizontal distance λ and a historical horizontal distance). The historical horizontal distance can be a horizontal distance λ previously calculated by the second calculating module 105. A movement of the electronic device 1 in relation to the volumetric region of interest 2 may cause Doppler Effect. The second calculating module 105 further calculates a Doppler factor D according to the calculated horizontal distance λ, the calculated included angle α, and the calculated vertical displacement d. Such a determination/estimation of the Doppler factor is known in the art.

The calculated horizontal distance λ is a distance between a reference plane of the electronic device 1 and the volumetric region of interest 2 along a direction perpendicular to the electronic device 1. The calculated included angle α is an included angle between an imaginary line connecting the electronic device and the volumetric region of interest 2 and the direction perpendicular to the electronic device 1. The calculated vertical displacement d is a displacement of the electronic device 1 along a direction parallel to the reference plane of the electronic device 1. The reference plane can be a center plane of the electronic device 1 between the flexible touch panel 50 before deformation and the back cover (not labeled).

Since the structure of the volumetric region of interest 2 is constant, when a relative movement occurs between the electronic device 1 and the volumetric region of interest 2 (for example, when the audience moves the electronic device 1 towards the top left direction as shown in FIG. 5), the spatial position of the electronic device 1 with respect to the volumetric region of interest 2 changes. Then, the sound characteristics of the first echo signals $S_{12}$ with respect to the first sound signals $S_{11}$, such as the intensity attenuation or the time delay, also change accordingly. That is, the sound characteristics of the first echo signals $S_{12}$ are related to the spatial position of the electronic device 1 with respect to the volumetric region of interest 2. Thus, the second calculating module 105 can calculate the horizontal distance λ, the included angle α, and the vertical displacement d according to the sound characteristics of the first echo signals $S_{12}$.

At block 88, the control module 101 controls the gas generator 70 to input gas into the deformation areas 60 to cause the deformation areas 60 to deform. In an embodiment, the memory 30 stores a preset gas inputting region. The preset range can be designed by actual use. In one embodiment, the preset gas inputting region can be designed by the extent to which the deformation areas 60 wrap the auricle. The control module 101 can select one gas inputting amount from the preset gas inputting region, and control the gas generator 70 to input gas into the deformation areas 60 according to the selected gas inputting amount. The deformation amount of the deformation areas 60, which can be characterized by a shape deformation factor S, depends on the amount of gas input and the material of the deformation areas 60, and can be determined by a relationship between different deformation amounts and gas inputting amounts. The control module 101 further determines the shape deformation factor S of the deformation areas 60 according to the selected gas inputting amount and the relationship. The deformation amount of the deformation areas 60 can affect the actual audio output by the electronic device 1. For example, the greater of the deformation amount, the more the audio effect will impact the user.

At block 89, the sound adjusting module 106 adjusts original factory settings of the electronic device 1 for outputting sound according to the calculated difference λ', the calculated included angle α, the calculated Doppler Effect D, and the shape deformation factor S. The adjusted factory settings can be described by function F(λ',α,D,S):

$$F(\lambda', \alpha, D, S) = \frac{D\cos^2(\alpha) f_{sp}(\lambda')}{S}$$

Wherein, $f_{sp}(\lambda')$ represents the original factory settings of the electronic device 1 for outputting sound. The original factory settings include default sound data such as default volume or default frequency for outputting sound.

In other embodiments, blocks 81~84 for user authentication can be omitted. That is, the control module 101 can first control the sound generators 10 to send the first sound signals $S_{11}$.

With the above configuration, since the factory settings of the electronic device 1 for outputting sound are adjusted according to the calculated difference λ', the calculated included angle α, the calculated Doppler Effect D, and the shape deformation factor S, the electronic device 1 can impart better sounds to the audience to improve the experience.

The embodiments shown and described above are only examples. Therefore, many commonly-known features and details are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. An electronic device comprising:
   at least one sound generator;
   a sound receiver;
   a flexible panel;
   a plurality of deformation areas positioned under the flexible panel;
   a gas generator connected to the plurality of deformation areas;
   a processor; and
   a storage device coupled to the processor and storing one or more programs to be executed by the processor, wherein when executed by the processor, the one or more programs cause the processor to:
     control the sound generator to send successive first sound signals to an ambient environment of the electronic device, wherein when a volumetric region of interest is positioned adjacent to the electronic device, at least a portion of the first sound signals is reflected by the volumetric region of interest to form first echo signals, the sound receiver is adapted to collect the first echo signals;
     obtain the first echo signals from the sound receiver;
     calculate a horizontal distance λ between the electronic device and the volumetric region of interest, an included angle α between the electronic device and the volumetric region of interest, and a vertical displacement d of the electronic device, according to the first echo signals, calculate a difference λ' between the calculated horizontal distance λ and a historical horizontal distance, and calculate a Doppler factor D according to the calculated horizontal distance λ, the calculated included angle α, and the calculated vertical displacement d;
     control the gas generator to input gas into the deformation areas to cause the deformation areas to deform, and determine a shape deformation factor S of the deformation areas; and
     adjust original factory settings of the electronic device for outputting according to the calculated difference λ', the calculated included angle α, the calculated Doppler Effect D, and the shape deformation factor S, the adjusted factory settings described by function F(λ',α,D,S):

$$F(\lambda', \alpha, D, S) = \frac{D\cos^2(\alpha) f_{sp}(\lambda')}{S};$$

wherein, $f_{sp}(\lambda')$ represents the original factory settings of the electronic device.

2. The electronic device of claim 1, wherein before controlling the sound generator to send successive first sound signals, the one or more programs further cause the processor to determine whether a structure of the volumetric region of interest matches a preset model, and the sound generator is controlled to send the first sound signals when the structure of the volumetric region of interest matches the preset model.

3. The electronic device of claim 2, wherein determining whether a structure of the volumetric region of interest matches a preset model comprises:
   controlling the sound generator to send successive second sound signals to the ambient environment, wherein at least a portion of the second sound signals is reflected by the volumetric region of interest to form second echo signals, the second echo signals are collected by the sound receiver;
   obtaining the second echo signals from the sound receiver;
   calculating structural characteristics of the volumetric region of interest according to the second echo signals, and determine the structure of the volumetric region of interest according to the calculated structural characteristics; and
   determining whether the determined structure matches the preset model.

4. The electronic device of claim 3, wherein the electronic device comprises a plurality of sound generators spirally arrange on the electronic device, a portion of the sound generators is controlled to send the second sound signals in an order so that a plurality of detecting points of the volumetric region of interest that reflects the second sound signals are spirally arranged.

5. The electronic device of claim 3, wherein calculating structural characteristics of the volumetric region of interest according to the second echo signals comprises:
   calculating the horizontal distances λ between the electronic device and each of the detecting points to obtain a distribution of the detecting points; and
   determining the structure of the volumetric region of interest.

6. The electronic device of claim 2, wherein the one or more programs further cause the processor to determine whether the electronic device is locked when the structure of the volumetric region of interest matches the preset model, and unlock the electronic device when the electronic device is locked.

7. A sound adjusting method applied in an electronic device comprising at least one sound generator, a sound receiver, a flexible panel, a plurality of deformation areas positioned under the flexible panel, and a gas generator connected to the plurality of deformation areas, the sound adjusting method comprising:
   controlling the sound generator to send successive first sound signals to an ambient environment of the electronic device, wherein when a volumetric region of interest is positioned adjacent to the electronic device, at least a portion of the first sound signals is reflected by the volumetric region of interest to form first echo signals, the sound receiver is adapted to collect the first echo signals;
   obtaining the first echo signals from the sound receiver;
   calculating a horizontal distance λ between the electronic device and the volumetric region of interest, an included angle α between the electronic device and the volumetric region of interest, and a vertical displacement d of the electronic device, between the first echo signals, calculate a difference λ' between the calculated horizontal distance λ and a historical horizontal distance, and calculate a Doppler factor D according to the calculated horizontal distance λ, the calculated included angle α, and the calculated vertical displacement d;
   controlling the gas generator to input gas into the deformation areas to cause the deformation areas to deform, and determine a shape deformation factor S of the deformation areas; and
   adjusting original factory settings of the electronic device for outputting sound according to the calculated difference λ', the calculated included angle α, the calculated Doppler Effect D, and the shape deformation factor S, the adjusted factory settings described by function F(λ',α,D,S):

$$F(\lambda', \alpha, D, S) = \frac{D\cos^2(\alpha)f_{sp}(\lambda')}{S};$$

wherein, $f_{sp}(\lambda)$ represents the original factory settings of the electronic device.

8. The sound adjusting method of claim 7, wherein before controlling the sound generator to send successive first sound signals, the sound adjusting method further comprises:
   determining whether a structure of the volumetric region of interest matches a preset model, wherein the sound generator is controlled to send the first sound signals when the structure of the volumetric region of interest matches the preset model.

9. The sound adjusting method of claim 8, wherein determining whether a structure of the volumetric region of interest matches a preset model comprises:
   controlling the sound generator to send successive second sound signals to the ambient environment, wherein at least a portion of the second sound signals is reflected by the volumetric region of interest to form second echo signals, the second echo signals are collected by the sound receiver;
   obtaining the second echo signals from the sound receiver;
   calculating structural characteristics of the volumetric region of interest according to the second echo signals, and determine the structure of the volumetric region of interest according to the calculated structural characteristics; and
   determining whether the determined structure matches the preset model.

10. The sound adjusting method of claim 9, wherein calculating structural characteristics of the volumetric region of interest according to the second echo signals comprises:
    calculating the horizontal distances λ between the electronic device and each of the detecting points to obtain a distribution of the detecting points; and
    determining the structure of the volumetric region of interest.

11. The sound adjusting method of claim 8, further comprising:
    determining whether the electronic device is locked when the structure of the volumetric region of interest matches the preset model; and
    unlocking the electronic device when the electronic device is locked.

* * * * *